G. G. FLOYD.
SHAFT OPERATING DEVICE.
APPLICATION FILED APR. 12, 1918.
1,304,867.
Patented May 27, 1919.
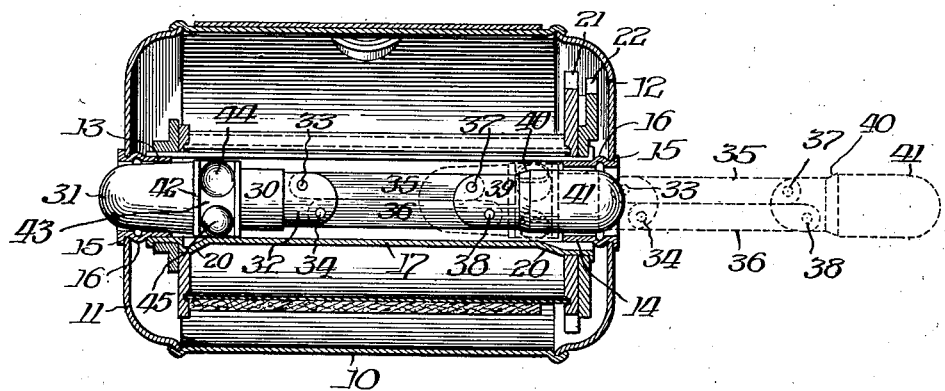
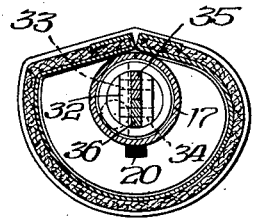
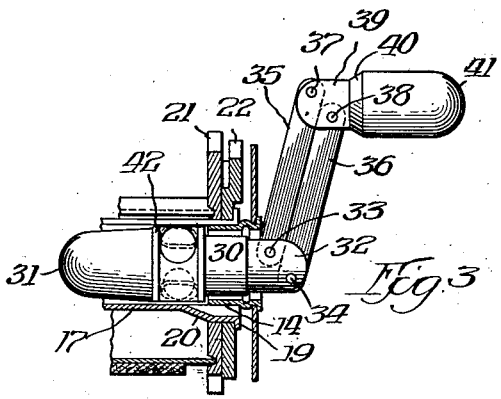
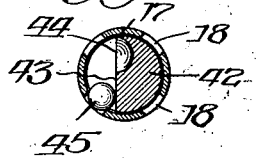
Witness:
Inventor
George G. Floyd
By Walter M. Fuller
Atty

UNITED STATES PATENT OFFICE.

GEORGE G. FLOYD, OF RIVERSIDE, ILLINOIS.

SHAFT-OPERATING DEVICE.

1,304,867.     Specification of Letters Patent.     Patented May 27, 1919.

Original application filed August 18, 1917, Serial No. 186,838. Divided and this application filed April 12, 1918. Serial No. 228,090.

*To all whom it may concern:*

Be it known that I, GEORGE G. FLOYD, a citizen of the United States, residing at Riverside, in the county of Cook and State of Illinois, have invented certain new and useful Improvements in Shaft-Operating Devices, of which the following is a specification.

My invention concerns manual devices or handles for rotating or turning shafts, which handle, when not in use, is housed, stored, or concealed in the shaft which it is adapted to revolve when in extended, operative, or cranked condition. The handle, therefore, is articulated, permitting it to be straightened out for sliding into the hollow shaft with which it is associated, and also rendering it capable of being bent to crank or offset form for manual actuation. Further features of the invention reside in the manner of rotatively supporting the shaft, the means used for preventing backward revolution thereof, frictional means for holding the handle in the shaft, the instrumentalities for limiting the bending and straightening of the handle, the improved form of clutching appliance between the handle and shaft which permits the former to slide in the latter, etc.

The attainment of these and other desirable objects will be understood by those skilled in the art from a consideration of a preferred embodiment of the invention illustrated in the accompanying drawing forming a part of this specification and throughout the various views of which like reference characters refer to the same parts. It is to be understood, however, that the invention is not limited and restricted to the precise and exact embodiment presented because the mechanical elements of the apparatus may be modified in many respects without departure from the substance and essence of the invention and without the sacrifice of any of its substantial benefits and advantages.

In the drawing:

Figure 1 is a vertical longitudinal section through the appliance through the axis of the shaft;

Fig. 2 is a cross-section through the shaft, the stropping appliance or element mounted thereon, and the handle contained within the shaft;

Fig. 3 is a detail section showing the handle extended in operative cranked condition, and Fig. 4 is a cross-section through the shaft and its operating means illustrating the clutch.

By reference to Fig. 1 of the drawing, it will be observed that the sheet-metal casing housing and inclosing the razor-blade stropping-mechanism, comprises a main-body 10 and opposite end-walls 11 and 12 apertured in alinement, each of such apertures accommodating a cylindrical, inwardly-projecting, hollow bearing-members 13 and 14 respectively, each upset at 15 and 16 on opposite sides of the corresponding supporting end-wall of the casing to maintain it properly in position. Revoluble on these bearings, which are of substantial size and length, is a hollow shaft 17 formed by transversely bending a flat sheet of metal to cylindrical shape with its longitudinal edges abutting, thus giving the shaft a lengthwise butt joint, as shown more clearly in Fig. 2. On this shaft a leather-faced stropping-element is mounted in any approved manner, as indicated in the same figure. Near one end, shaft 17 has four holes or apertures 18 therethrough in the same plane transverse to the axis of the shaft and desirably spaced equal distances apart and comprising parts of a clutch mechanism adapted to be active or operative in one direction of rotation only. Shaft 17 also has at one end a flange 19 which assists in holding the parts of the stropping-element thereon, and at 20 the shaft is formed with an integral key struck up out of the metal of the shaft and adapted for association with two gears or gear-sectors 21 and 22.

For the purpose of manually rotating this shaft and its stropping-element, I provide a handle or crank of peculiar and advantageous construction. When the handle is not to be used, it is straightened out and housed or contained within the shaft and retained therein by friction, and when the appliance is to be actuated, the handle is projected partially out of the shaft, the extended portion being bent into crank form for operation.

This handle or operating device comprises a body 30 having a slightly-tapered end-portion 31 adapted to fit in the hollow bearing-member 13 and be frictionally held therein when not in use, the end of the part 31 being rounded as shown, and, when the handle is inoperatively housed within the shaft, projecting slightly beyond the bearing member, so that it may be readily engaged by the finger or thumb and pushed inwardly, freeing it from such bearing-member. The other end of member 30 is bifurcated at 32 and has pivoted to such divided portion at 33 and 34 two links 35 and 36, the opposite ends of which are pivoted at 37 and 38 to a forked portion 39 of a member 40 on which a handle 41 is revolubly mounted. These companion links are of the same length, but their pivots are offset as shown, whereby to limit their turning movement thereon.

The part 30 has an enlarged portion 42 of substantially the diameter of the interior of the hollow-shaft 17, one-half or the major portion of this enlarged section being cut away so that in cross-section it is substantially semi-cylindrical, as shown in Fig. 4, providing a flat face 43 having a semispherical recess or cavity 44 at one end adapted to partially accommodate the clutch ball 45 under certain circumstances.

In Fig. 1 in full lines, the handle and its associated mechanism is shown inclosed and frictionally held within the shaft, and in dotted lines, this part of the mechanism is illustrated as drawn out, whereas, in Fig. 3 the handle is indicated as bent into cranked operative position. Retraction of the handle from the shaft is limited by the engagement of the part 42 with the inner edge of the bearing member 14 and when the parts are in this relation, the clutch-ball 45 will be in proper position for coöperation with any one of the four recesses or apertures 18 of the shaft, provided the handle is turned in a clockwise direction. Under these circumstances, the handle is operatively connected to the shaft, as shown in Fig. 4. If, however, it is attempted to rotate the handle in the opposite or counter-clockwise direction, the ball becomes seated in the recess 44 and does not engage or project into any of the apertures 18 so that the shaft cannot be rotated in the wrong direction and cause mutilation of the leather facing of the stropper by the blade being sharpened. As will be readily seen from Fig. 3, the extent to which the handle may be bent to cranked relation is limited and restricted by the two links 35, 36, engaging each other edgewise. In similar manner the handle when being straightened out is prevented from bending in the reverse direction by the edgewise engagement of these links, and in passing from the position shown in Fig. 3 to the dotted line position indicated in Fig. 1, the links separate edgewise, but are in engagement in either one of these extreme positions.

The operation of the appliance is practically as follows:

Assuming that the handle is straightened out and accommodated and concealed in its shaft 17, as shown in Fig. 1, the operator, by pressing on the end of part 31, frees its frictional engagement with the coöperating bearing-member 13, and the handle is projected to the dotted line position shown in the same figure, which brings the clutch-elements 45 and 18 into register, the ball traveling along with the part 42. Then the handle is bent or cranked into the position shown in Fig. 3, ready for operating the appliance. As has been explained, the bending of the handle is limited as to degree or extent by the edgewise engagement of the two bars or links 35 and 36 with one another and such bent portions of the handle prevent the clutch element from moving inwardly out of register, the handle itself being prevented from further outward displacement by the engagement of the part 42 with the adjacent bearing-member 14. Upon completion of the stropping or sharpening operation, the handle is straightened out and pushed back into the shaft which it had previously operated, being retained in the latter by frictional engagement with the bearing-member 13.

By those skilled in this art it will be appreciated that the parts of this appliance are so constructed that they are economical to manufacture and may be assembled with ease and despatch, that the device presents a pleasing appearance, that it is unlikely to become damaged or injured in service, that it has a disappearing operating handle, and that revolution of the shaft and its stropping-element in the wrong direction is prevented.

It will be appreciated, therefore, that the various objects of this invention mentioned have been obtained in the device presented as well as other minor objects.

This application is a division of my earlier application, Serial No. 186,838, razor blade sharpeners, filed August 18, 1917.

I claim:

1. In an appliance of the character described, the combination of a casing, a shaft revoluble in said casing, and an articulated shaft-operating means comprising a shaft-operating member, a handle proper, and connecting means pivoted to said member and handle, said operating means being constructed to turn said shaft from the outside of said casing when in crank form and to be accommodated in said casing in straight unbent condition when not in use, substantially as described.

2. In an appliance of the character described, the combination of a casing, a shaft revoluble in said casing, an articulated shaft-operating means slidable in and out of said casing and comprising a shaft-operating member, a handle proper, and connecting means pivoted to said member and to said handle, and a one-way clutch connection between said shaft and said shaft operating means, the latter being constructed to turn said shaft from the outside of said casing when in crank form and to be accommodated in said casing in straight unbent condition when not in use, substantially as described.

3. In an appliance of the character described, the combination of a rotatable hollow shaft, and an articulated operating means for said shaft comprising a shaft operating member slidable in said shaft, a handle proper, and connecting means pivoted to said member and to said handle, said operating means being constructed for accomodation in said shaft in straight unbent condition when not in use and adapted to turn the shaft when partially withdrawn therefrom and in crank form, substantially as described.

4. In an appliance of the character described, the combination of a hollow rotatable shaft, and an articulated shaft operating means comprising a shaft operating member slidable in said shaft, a one-way clutch between said shaft and member permitting rotation of the shaft in one direction only, a handle proper, and connecting means pivoted to said member and to said handle, said shaft operating means being constructed for accommodation in said shaft in straight unbent condition when not in use and adapted to turn the shaft when partially withdrawn therefrom and in crank form, substantially as described.

5. In an appliance of the character described, the combination of a rotatable hollow shaft, and an articulated shaft operating means comprising a shaft operating member slidable in said shaft, a handle proper, and connecting means pivoted to said member and to said handle, said shaft operating means being constructed for accommodation and retention by friction in said shaft in straight unbent condition when not in use and adapted to turn the shaft when partially withdrawn therefrom and in crank form, substantially as described.

6. In an appliance of the character described, the combination of a rotatable hollow shaft, an articulated operating means for said shaft comprising a shaft operating member slidable in said shaft, a one-way clutch between said shaft and member permitting rotation of the shaft by said member in one direction only a handle proper, and connecting means pivoted to said member and to said handle, said operating means being constructed for accommodation in said shaft in straight unbent condition when not in use and adapted to turn the shaft when partially withdrawn therefrom and in crank form, and means to prevent complete withdrawal of said articulated operating means from said shaft, substantially as described.

7. In an appliance of the character described, the combination of a rotatable hollow shaft, an articulated operating means for said shaft comprising a shaft operating member slidable in said shaft, a handle proper, and connecting means pivoted to said member and to said handle, said operating means being constructed for accommodation in said shaft in straight unbent condition when not in use and adapted to turn the shaft when partially withdrawn therefrom and in crank form, and means to limit the bending of said articulated operating means in crank form, substantially as described.

8. In an appliance of the character described, the combination of a rotatable hollow-shaft open at both ends, and an articulated handle adapted to be accommodated in substantially-straight condition in said shaft when not in use with one end projecting slightly through said shaft and adapted to project from the other end of the shaft for use and in bent condition turn the shaft, substantially as described.

9. In an appliance of the character described, the combination of a rotatable hollow-shaft and an operating mechanism for said shaft comprising a shaft-engaging portion, a handle-portion, and a pair of links pivoted to each of said portions, substantially as described.

10. In an appliance of the character described, the combination of a rotatable hollow-shaft and an operating mechanism for said shaft comprising a shaft-engaging portion, a handle-portion, and a pair of links pivoted in offset relation to each of said portions, substantially as described.

11. In an appliance of the character described, the combination of a rotatable hollow-shaft and an operating mechanism for said shaft comprising a shaft-engaging portion, a handle-portion, and a pair of links in the same plane and pivoted in offset relation to each of said portions, substantially as described.

12. In an appliance of the character described, the combination of a casing, a pair of hollow bearing-members mounted on said casing, a hollow-shaft revoluble on said bearing-members, an articulated handle adapted to be accommodated in said shaft in substantially-straight unbent condition when not in use and adapted to project from the shaft through one of said bearings and be bent to crank form for rotation of the shaft, substantially as described.

13. In an appliance of the character described, the combination of a casing, a pair of hollow bearing-members mounted on said casing, a hollow-shaft revoluble on said bearing-members, a handle to turn said shaft constructed for accommodation in the shaft when not in use and retention therein by frictional engagement with one of said bearing-members, substantially as described.

14. In an appliance of the character described, the combination of a casing, a pair of hollow bearing-members open at both ends mounted on said casing, a hollow-shaft revoluble on said bearing-members, and a handle to turn said shaft and constructed for accommodation in said shaft when not in use and retention therein by frictional engagement with one of said bearing-members, substantially as described.

15. In an appliance of the character described, the combination of a casing, a pair of hollow bearing-members mounted on said casing, a hollow-shaft revoluble on said bearing-members, and an operating-mechanism for said shaft comprising a shaft-engaging portion, a handle-portion, and a pair of links pivoted to each of said portions, said operating mechanism being adapted to be accommodated in substantially-straight condition in said shaft when not in use, substantially as described.

16. In an appliance of the character described, the combination of a casing, a pair of hollow bearing-members mounted on said casing, a hollow-shaft revoluble on said bearing-members, and an operating-mechanism for said shaft comprising a shaft-engaging portion, a handle-portion, and a pair of links pivoted to each of said portions, said operating-mechanism being adapted to be accommodated in substantially-straight condition in said shaft when not in use with said shaft-engaging portion frictionally held by one of said bearing-members, substantially as described.

17. In an appliance of the character described, the combination of a casing, a pair of hollow bearing-members mounted on said casing, a hollow-shaft revoluble on said bearing-members, and an operating-mechanism for said shaft comprising a shaft-engaging portion, a handle-portion, and a pair of links pivoted in offset relation to each of said portions, said operating-mechanism being adapted to be accommodated in substantially-straight condition in said shaft when not in use with said shaft-engaging portion frictionally held by one of said bearing-members and projecting therefrom, thereby permitting release of such frictional engagement, substantially as described.

18. In an appliance of the character described, the combination of a casing, a hollow-shaft revoluble in said casing, and an articulated handle to operate said shaft constructed to be accommodated in said shaft in substantially-straight condition when not in use and retained therein by friction, said handle when thus housed in the shaft projecting from said casing, permitting release of such frictional engagement, substantially as described.

19. In an appliance of the character described, the combination of a rotatable hollow shaft, an articulated shaft-operating means to revolve said shaft and adapted when in straight condition to be housed in said shaft, and clutch elements adapted to connect said operating means and shaft for rotation of the latter in one direction only, one of said elements being slidable with said operating means in said shaft, substantially as described.

GEORGE G. FLOYD